US012670063B2

(12) United States Patent (10) Patent No.: US 12,670,063 B2
Croxford et al. (45) Date of Patent: Jun. 30, 2026

(54) MEMORY ERROR CHECKING IN DATA PROCESSING SYSTEMS

(71) Applicant: Arm Limited, Cambridge (GB)

(72) Inventors: Daren Croxford, Swaffham Prior (GB); Jussi Tuomas Pennala, Lund (SE); Philip Malcolm Done, Cambridge (GB); Mark Stephen Bellamy, Haverhill (GB)

(73) Assignee: ARM Limited, Cambridge (GB)

( * ) Notice: Subject to any disclaimer, the term of this patent is extended or adjusted under 35 U.S.C. 154(b) by 5 days.

(21) Appl. No.: 18/899,342

(22) Filed: Sep. 27, 2024

(65) Prior Publication Data

US 2026/0093578 A1 Apr. 2, 2026

(51) Int. Cl.
*G06F 11/00* (2006.01)
*G06F 11/10* (2006.01)
*G06F 12/02* (2006.01)

(52) U.S. Cl.
CPC ........ *G06F 11/1044* (2013.01); *G06F 12/023* (2013.01); *G06F 2212/1032* (2013.01)

(58) Field of Classification Search
CPC .... G06F 11/1044; G06F 12/023; G06F 11/16; G06F 2212/1032; G06F 12/16; G06F 11/08; G06F 11/14; G06F 12/14; G06F 11/00
See application file for complete search history.

(56) References Cited

U.S. PATENT DOCUMENTS

| | | | | |
|---|---|---|---|---|
| 8,539,303 | B2 * | 9/2013 | Lu | H03M 13/05 |
| | | | | 714/755 |
| 9,804,978 | B2 * | 10/2017 | Hinkle | G06F 3/0688 |
| 10,606,713 | B2 * | 3/2020 | Kim | G06F 12/0246 |
| 10,671,497 | B2 * | 6/2020 | Glancy | G11C 29/76 |
| 10,872,011 | B2 * | 12/2020 | Bains | G11C 11/409 |
| 12,001,279 | B2 * | 6/2024 | Rapalli | G06F 11/1004 |
| 2024/0012673 | A1 | 1/2024 | Garbett et al. | |

* cited by examiner

*Primary Examiner* — Esaw T Abraham
(74) *Attorney, Agent, or Firm* — Pearl Cohen Zedek Latzer Baratz LLP

(57) ABSTRACT

Disclosed is memory access logic that is operable to perform different accesses to a particular memory element depending on whether or not a memory error checking scheme is being implemented for the memory element. A set of error checking bits are stored in the memory element for implementing the memory error checking scheme. The memory error checking scheme can thus be selectively enabled and memory accesses performed accordingly such that when the memory error checking scheme is enabled, it is ensured that the required error checking bits are accessed.

20 Claims, 9 Drawing Sheets

| Lane 0 |
|--------|
| 43b |

| Channel 0 | Channel 1 | Channel 2 | Channel 3 |
|-----------|-----------|-----------|-----------|
| 11b | 11b | 11b | 11b |
| 9b<br>data<br>2b<br>ECC | | | |

FIG. 6

| Channel 0 | Channel 1 | Channel 2 | Channel 3 | ECC Channel |
|-----------|-----------|-----------|-----------|-------------|
| 9b | 9b | 9b | 9b | 9b |
| | | | | |

FIG. 7

MEMORY ERROR CHECKING IN DATA PROCESSING SYSTEMS

BACKGROUND

The technology described herein relates to data processing systems in which processing units within the data processing system may need to access a respective memory element (e.g. a RAM), and in particular to apparatus including memory access logic for controlling a processing element's access to a respective memory element that is available to that processing element.

It is becoming increasingly common for data processors and data processing systems to be used to process data for use in environments such as automotive and medical environments where it is important, e.g. for safety reasons, that the processing output is correct.

For example, graphics processors and graphics processing systems have traditionally been used for rendering computer graphics for applications such as gaming, where there may be no particular consequence if the processing output is incorrect. However, graphics processors and graphics processing systems are now often used to render images for displaying to a driver of a vehicle, for example for a cockpit display, or as a mirror replacement system. In such situations, any errors in the processing output of the graphics processor can have safety implications for the driver of the vehicle and/or for other people in or in proximity to the vehicle, and so it is important that the processing performed by the graphics processor is correct.

For safety critical applications, such as data processing in automotive or medical environments, it is therefore important to be able to mitigate any errors that may impact the processing output, whether these errors are due to transient faults such as due to high energy particle strikes, such as cosmic rays, alpha or beta particles, or gamma radiation, causing bit flips, or due to more permanent faults/defects affecting the processor hardware.

One way to mitigate such errors is to provide, for one or more instances of memory element within the data processing system (which memory element could, e.g., be a (portion) of a "main" memory of the data processing system, but could also be an internal memory element, such as SRAM that is used to implement registers, internal caches, buffers, etc., for the processing elements within the data processor (or processing system)), an appropriate error detection and/or correction (generally, "error checking") "memory protection" scheme that is operable to detect, and in some cases, optionally correct, one or more bit errors in chunks of data that are (to be) stored in the memory element.

The present Applicants however believe that there remains scope for improvement when implementing memory error checking (protection) schemes within data processing systems.

BRIEF DESCRIPTION OF THE DRAWINGS

Embodiments of the technology described herein will now be described, by way of example only, and with reference to the accompanying drawings, in which:

FIG. 6 shows an example of a RAM configuration according to an embodiment;

FIG. 7 shows an example of a RAM configuration according to another embodiment;

Like reference numerals are used for like features throughout the drawings, where appropriate.

DETAILED DESCRIPTION

Figure 1:
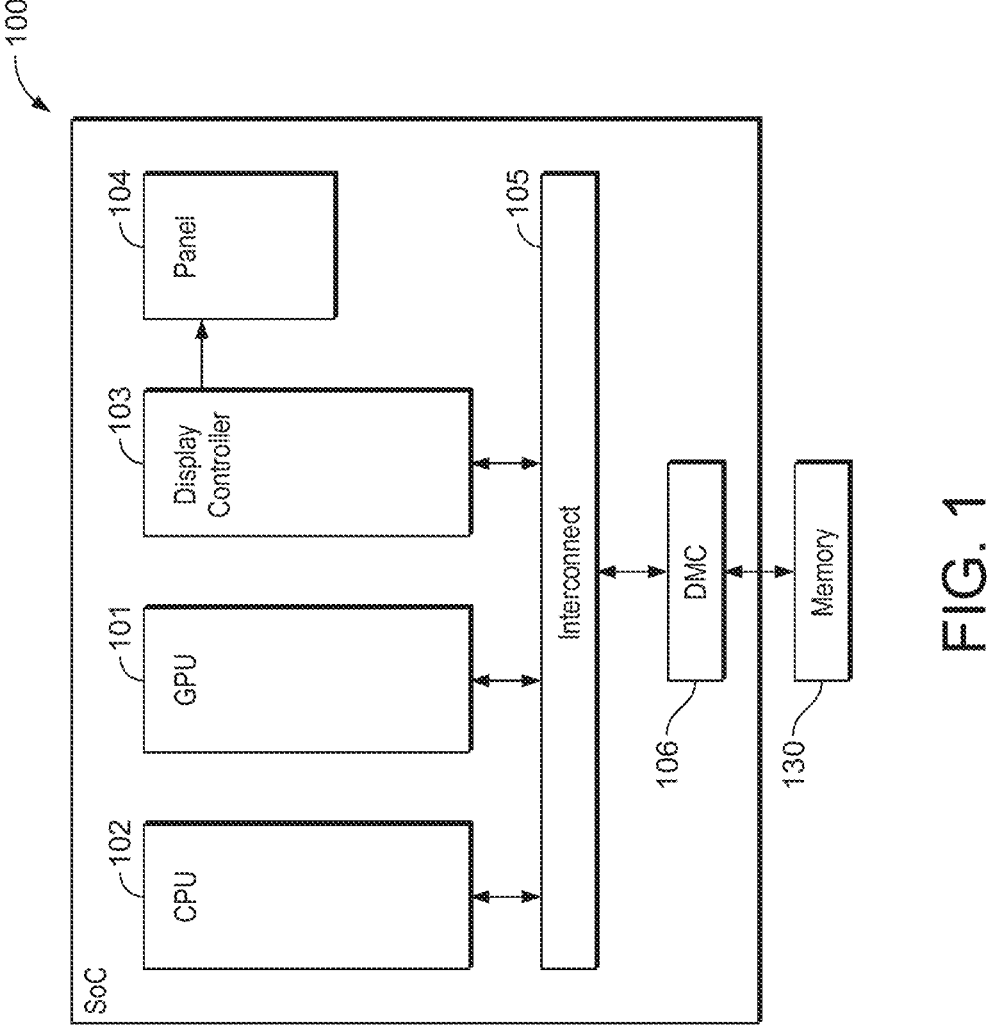
FIG. 1 shows schematically an embodiment of a data processing system.

A first embodiment of the technology described herein comprises a data processing system comprising:

at least one processing element;

a respective memory element (e.g. a RAM) that the at least one processing element is operable to access when performing its processing, wherein the memory element comprises an access lane, wherein the access lane has a certain data width and is operable and configured to store within that data width a respective set of data bits and to also store within that data width an associated set of one or more error checking bits that are usable to implement a memory error checking (protection) scheme for the set of data bits, the error checking bits thus being stored in the (same) access lane of the memory element together with the set of data bits for which the error checking bits are implementing the memory error checking (protection) scheme, and wherein the access lane is configured as a set of plural channels, each channel corresponding to a respective sub-portion of the access lane; and an associated memory interface circuit (unit) including memory access logic for controlling the at least one processing element's access to the respective memory element, wherein the memory error checking (protection) scheme can be selectively enabled in respect of the memory element, and wherein, when new data is to be written to a sub-portion of the access lane, the memory access logic is configured to perform different memory access operations depending on whether or not the memory error checking (protection) scheme is enabled, wherein:

when the memory error checking (protection) scheme is enabled, the memory access logic is configured to perform a first access operation comprising reading the full data width of the access lane, thus including reading all of the data bits and the corresponding error checking bits, and then writing the new data into the full data width of the access lane together with an updated set of error checking bits based on the new data, whereas when the memory error checking (protection) scheme is not enabled, the memory access logic is operable to perform a second, different access operation in which the new data can be written to a selected one or more of the channels of the set of plural channels into which the access lane is configured.

A second embodiment of the technology described herein comprises a method of operating a data processing system, wherein the data processing system comprises:

at least one processing element;

a respective memory element (e.g. a RAM) that the at least one processing element is operable to access when performing its processing, wherein the memory element comprises an access lane, wherein the access lane has a certain data width and is operable and configured to store within that data width a respective set of data bits and to also store within that data width an associated set of one or more error checking bits that are usable to implement a memory error checking (protection) scheme for the set of data bits, the error checking bits thus being stored in the (same) access lane of the memory element together with the set of data bits for which the error checking bits are implementing the memory error checking (protection) scheme, and wherein the access lane is configured as a set of plural channels, each channel corresponding to a respective sub-portion of the access lane; and an associated memory interface circuit (unit) including memory access logic for controlling the at least one processing element's access to the respective memory element, the method comprising:

determining whether the memory error checking (protection) scheme is enabled in respect of the memory element, and when new data is to be written to a sub-portion of the access lane, the memory access logic performing different memory access operations depending on whether or not the memory error checking (protection) scheme is enabled, wherein:

when it is determined that the memory error checking (protection) scheme is enabled, the memory access logic performs a first access operation comprising reading the full data width of the access lane, thus including reading all of the data bits and the corresponding error checking bits, and then writing the new data into the full data width of the access lane together with an updated set of error checking bits based on the new data, whereas when it is determined the memory error checking (protection) scheme is not enabled, the memory access logic is operable to perform a second, different access operation in which the new data can be written to a selected one or more of the channels of the set of plural channels into which the access lane is configured.

The technology described herein relates generally to a data processing system including a processing element (or set of processing elements) that is in communication with a respective memory element (e.g. a RAM) wherein the processing element is operable to access the respective memory element when the processing element is performing its respective processing, such that during the processing of data by the processing element (or set of processing elements), data may be transferred from the processing element(s) to the memory element, and vice versa. In the data processing system according to the technology described herein, such memory transactions are processed by an associated memory interface circuit (unit) for the memory element, the memory interface circuit (unit) including appropriate memory access logic that controls the processing element(s) access to the memory element.

The memory element is configured as, and hence comprises, at least one "access lane" and is operable and configured to store within that access lane a respective set of "data" bits that can be (and are) used for storing chunks of data within that access lane of the memory element.

When data is to be stored in an access lane of the memory element, the values of the data bits within the set of "data" bits within that access lane may be set as appropriate in order to store the desired data, e.g. in the normal manner for storing data within a memory element.

According to the technology described herein, the access lane is also operable and configured to store a corresponding set of "error checking" bits that can be (and selectively are) used to implement a suitable memory error checking (protection) scheme for the respective set of data bits stored within that access lane. The values of the "error checking" bits may thus be, and generally are, calculated from the values of (all of) the data bits within the access lane's respective set of data bits, such that the error checking bits are thereby associated with, and provide memory error checking protection over the full set of data bits stored within the access lane.

That is, the data processing system in the technology described herein is a data processing system that supports a suitable memory error checking (protection) scheme that can be used to detect, and in embodiments correct, one or more bit errors in chunks of data that are stored in the memory element. Further, according to the technology described herein, the "error checking" bits that are used to implement the memory error checking (protection) scheme are stored in the (same) access lane of the memory element together with the set of data bits for which the error checking bits are implementing the memory error checking (protection) scheme. Thus, the set of "error checking" bits are associated with, and calculated based on, the (entire) set of data bits that are provided within the access lane, and are stored together with the set of data bits in the (same) access lane.

Further, as will be discussed further below, there are typically a larger number of data bits compared to error checking bits.

Thus, the memory error checking (protection) scheme is implemented in respect of a (and each) particular access lane of the memory element.

In embodiments, there may (only) be a single access lane. However, a memory element may in general contain two or more access lanes, as desired. In that case, the memory error checking (protection) scheme may therefore be implemented separately in respect of each of the two or more access lanes, with each access lane storing its own set of data bits and corresponding error checking bits that have been calculated based on those data bits.

This approach. Where the error checking bits are stored together with the data bits within the same access lane, has been found to be more (area) efficient (e.g. compared to storing the "error checking" bits needed to implement such error checking (memory protection) scheme separately, e.g. in a separate memory element).

Storing the error checking bits together with the data bits within the same access lane then means, however, that in order to perform the desired memory error checking (protection) operations, any accesses to the memory element must be performed over the full data width of the relevant access lane, i.e. such that all of the data bits and all of the corresponding error checking bits are accessed together, e.g. as part of a single (same) memory access transaction.

Thus, when reading data from the memory element, when the memory error checking (protection) scheme is enabled, the memory access logic within the associated memory interface circuit (unit) for the memory element should be configured to always read the full data width of the relevant access lane. This can be done by the memory access logic performing an appropriate memory read operation. For example, a suitable memory read operation can be, and in embodiments is, performed in two steps, namely a first step to set on the read data bus the address within the memory element that is to be read (i.e. the full data width of the relevant access lane, in this situation) and a second step to then read the data from the set address. This memory read operation can therefore be done in two processing cycles.

When writing data to the memory element, if data is to be written to the full data width of the relevant access lane, this can be done as normal, e.g. in a single step as a standard write operation. On the other hand, it may be desired in some situations to write data to less than the full data width of an access lane.

However, as mentioned above, in order to perform the desired memory error checking (protection) operation using the error checking bits, the full data width of the access lane must be accessed.

Therefore, when new data is to be written to the memory element, when the memory error checking (protection) scheme is enabled, this should be, and according to the technology described herein is, done by first reading the full data width of the relevant access lane, i.e. reading all of the data bits and the corresponding error checking bits, and then writing the new data into the full data width of the access lane together with an updated set of error checking bits based on the new data.

For example, and in embodiments, this operation can be (and is) performed using a 'read-modify-write' operation. The 'read-modify-write' operation thus in embodiments comprises four steps, namely a two-step read operation, as discussed above, followed by a modify operation and then a final write operation (which write operation is in embodiments performed in a single step). In embodiments, the modify operation can be merged with the write operation, such that the 'read-modify-write' operation may therefore take at least three processing cycles.

In embodiments, the 'read-modify-write' operation is performed as an atomic (indivisible) operation but this may not be strictly necessary.

The approach as described above therefore works well to support the desired memory error checking (protection) scheme in a more (area) efficient manner. However, the need to always access the full data width of the access lane(s) may introduce additional processing cycles (and hence consume more energy), particularly when data is to be written to a sub-portion of an access lane (i.e. less than the full data width of the access lane). For example, in contrast, if no memory error checking (protection) scheme were performed, such writes could be performed in a single step as a standard write operation, thus potentially taking only a single processing cycle.

In this regard, however, the present Applicants have now recognised that even where such memory error checking (protection) scheme is supported for a particular memory element, in many situations it may not be necessary for the memory error checking (protection) scheme to always be applied in respect of that memory element. There are various reasons why this may be the case.

For instance, the processing unit may in embodiments be used to perform a mixture of safety critical and non-safety critical processing work, and in such cases the memory error checking (protection) scheme may generally only need to be used when the processing unit is performing safety critical processing work.

As another example, rather than being used strictly for functional safety purposes, the memory error checking (protection) scheme could be used to increase reliability, e.g. to mitigate (manufacturing) defects in the memory element. In this respect, it will be appreciated that, as semiconductor manufacturing processes become more advanced (e.g. "3 nm" processes), and as data processors become more complex, e.g. with more (local) memory elements being provided, there may be both an increased risk of defects and more instances of memory elements that may contain such defects. Traditionally, any such defects might mean that the chip has to be discarded (or potentially sold as a reduced function chip). As alluded to above, however, memory error checking (protection) schemes may be used to detect, and in embodiments correct, any errors affecting the memory, including errors that may result from manufacturing defects.

Thus, even if a memory element is defective, the present Applicants recognise that it may still be possible to use the memory element so long an appropriate memory error checking (protection) scheme is provided, i.e. so long as any errors resulting from the defect can be suitably detected and corrected by the memory error checking (protection) scheme.

In this case, providing such memory error checking (protection) scheme may allow defective memory elements to still be used, thereby effectively improving manufacturing yield. On the other hand, if a particular memory element is not defective, there may be no need to apply such memory error checking (protection) scheme.

Thus, in the technology described herein, the memory error checking (protection) scheme can be selectively enabled in respect of a particular memory element.

Further, as will be explained further below, this can in embodiments be done in a finer grained manner, for example on a per-memory element and/or processing element basis, and in embodiments on a per-output basis for a particular processing element.

In this respect, whilst embodiments are primarily described above in relation to a single memory element it will be appreciated that a given data processor (and data processing system) may include a larger number of memory elements, and in embodiments, appropriate memory error checking (protection) schemes may be implemented in the manner described above for multiple of (e.g. each of) these memory elements, as desired.

Thus, whether or not the memory error checking (protection) scheme is enabled can in embodiments be controlled and selected for a particular memory element (or set of memory elements) (e.g. rather than only being controlled and selected for all memory elements in the data processing system for which such memory error checking (protection) scheme is provided, although it could of course also be the case that the selection and control is performed for the entire data processing system, and this may be appropriate for some use cases).

The technology described herein thus allows the memory error checking (protection) scheme to be selectively enabled/disabled in respect of a particular memory element. This then means, however, that when the memory error checking (memory protection) scheme is not enabled in respect of a particular memory element, it may not generally be necessary to access the full data width of the relevant access lane of the memory element when performing a particular read or write operation, and in that case always performing memory accesses according to the particular access operations described above (i.e. that are appropriate for the case when the memory error checking (protection) scheme is enabled) may be inefficient.

Thus, in the technology described herein, the memory access logic within the memory interface circuit (unit) associated with a respective memory element is configured to perform different memory access operations depending on whether or not the memory error checking (protection) scheme is enabled for the memory element in question. In this way, the technology described herein provides a more flexible approach for supporting such memory error checking (protection) schemes that can provide an overall more efficient operation, in particular by avoiding having to always access the full data width of the access lane(s) when it is not necessary to do so (i.e. when the memory error checking (protection) scheme is not enabled).

For instance, as discussed above, when the memory error checking (protection) scheme is enabled, in order to write data to less than the full data width of the access lane, this must be done by first reading the full data width of the access lane, and then modifying the relevant bits, before writing the updated data again across the full data width of the access lane (e.g., by performing a suitable read-modify-write operation).

On the other hand, when the memory error checking (protection) scheme is not enabled, this may not be necessary, and it may be possible to instead perform the write operation directly, i.e. by writing data to (only) a desired sub-portion of the access lane, without having to update the error checking bits, and therefore without having to access the full data width of the access lane. This can therefore in embodiments be done using a standard write operation, in embodiments in a single step (processing cycle).

For example, when the memory error checking (protection) scheme is not enabled, if it is desired to write to a particular sub-portion of the access lane (only), it may be possible to perform this write using 'strobes' wherein each strobe writes to a respective sub-portion of the access lane (e.g. a 'strobe' may correspond to a single byte of the write data bus). Thus, the memory access interface circuit (unit) when performing such write operations can generate an appropriate strobe signal to indicate which sub-portions (strobe lanes) (e.g. bytes) of the access lane are valid for the write operation, and the write operation will then proceed accordingly to write data into those sub-portions (strobe lanes).

It will be appreciated that the strobes/sub-portions may not align exactly with the sub-portion of the access lane that is being written to, but using strobes in this way saves having to always access the full data width of the access lane. Further, this can be done in fewer processing cycles, and hence with reduced energy consumption, compared to the read-modify-write operation that may otherwise be forced when the memory error checking (protection) scheme is enabled.

Thus, according to the technology described herein, when new data is to be written to a sub-portion of the access lane of the memory element, the memory access logic within the memory access interface circuit (unit) is selectively controllable to perform different memory access operations, including:

a first access operation comprising reading the full data width of the access lane, thus including reading all of the data bits and the corresponding error checking bits, and then writing the new data into the full data width of the access lane together with an updated set of error checking bits based on the new data; and a second, different access operation in which the new data can be written to a selected one or more of the channels of the set of plural channels into which the access lane is configured.

In particular, as discussed above, the first access operation should be used when (and whenever) the memory error checking (protection) scheme is enabled such that the full data width of the access lane is always accessed as part of the (sub-access lane) write operation.

However, when the memory error checking (protection) scheme is not enabled, the requirement to always access the full data width of the access lane can be relaxed, and so the write operation can be performed differently. In that case, if it is possible to write the data to a selected one or more of the channels (i.e. strobe lanes), i.e. that encompass the sub-portion of the memory element that the data is to be written to, this can be (and in embodiments is) done according to the second, different access operation.

It will be appreciated that in some cases it may nonetheless still be desired to perform read-modify-write operation even when the memory error checking (protection) scheme is not enabled, and this may still be done. But, according to the technology described herein, when the memory error checking (protection) scheme is not enabled, the memory access logic is operable to perform the second, different operation, i.e. rather than being forced to always access full data width of the access lane as in the first operation that is performed when the memory error checking (protection) scheme is enabled.

Thus, the memory access logic within the memory access interface circuit (unit) effectively supports different access pipelines depending on whether or not the memory error checking (protection) scheme is enabled. For example, if the memory error checking (protection) scheme is not enabled, the access pipeline can effectively skip the error checking encoding/decoding operations (stages), and so there is correspondingly no need to access the error checking bits. Whereas, if the memory error checking (protection) scheme is enabled, the access pipeline should be performed in full, i.e. including the error checking encoding/decoding operations (stages), and so the memory access logic should correspondingly be configured to always access the full data width of the access lane including all of the data bits and all of the error checking bits.

The examples above relate primarily to the write operation. It will be appreciated that when reading data from the or an access lane of the memory element, when the memory error checking (protection) scheme is enabled, the read operation should also be performed so as to always access the full data width of the access lane. On the other hand, when the memory error checking (protection) scheme is not enabled, this is not necessary, and the read operation only needs to read the desired data (and so this is in embodiments done). For example, this can be performed as a standard read transaction in both cases, but when the memory error checking (protection) scheme is enabled the read transaction is configured to always read in the full data width of the access lane in question (i.e. the full address range for that access lane). If desired, the read transaction could also be performed using strobes (but this is not typically necessary).

In this regard, the (and each, where there are plural) access lane of the memory element in the technology described herein is further arranged and configured to facilitate these different access operations. In particular, as will be explained further below, the (or each) access lane of the memory element is further configured as a set of plural (distinct) channels, each channel corresponding to a respective (unique) sub-portion of the access lane.

Further subdividing the access lane(s) into these channels may thus facilitate performing finer-grained access to the access lane(s), although as discussed above this should only be (and is only) done when the memory error checking (protection) scheme is not enabled. For example, subdividing the access lane(s) into these access channels may facilitate performing write access operations using strobes when it is possible and desired to do so (i.e. when the memory error checking (protection) scheme is enabled), e.g. as above. That is, each "channel" into which the access lane is configured may, and in embodiments does, correspond to a respective strobe lane.

(For the avoidance of doubt, although the access lane is configured as a set of (distinct) channels, note that the memory error checking (protection) scheme is implemented over the full set of channels, i.e. for the full data width of the access lane (rather than having separate memory error checking (protection) for each channel, which would be very area inefficient).)

Thus, according to the technology described herein, the access lane is accessible at finer granularity than the full data width of the access lane, but this is only done when the memory error checking (protection) scheme is not enabled (whereas when the memory error checking (protection) scheme is enabled, the access lane is always accessed in full). That is, the memory access logic is operable to perform different access operations depending on whether or not the memory error checking (protection) scheme is enabled. This can therefore provide an overall improved arrangement that is able to support such memory error checking (protection) scheme in an area efficient manner, but also allows increased performance when the memory error checking (protection) scheme is not required.

The technology described herein may therefore provide various benefits compared to other possible approaches.

As discussed above, the technology described herein relates particularly to the situation where a memory element is provided with an appropriate memory error checking (protection) scheme, but wherein this memory error checking (protection) scheme can be selectively enabled/disabled in respect of the memory element. As alluded to earlier, there are various reasons why it might be desirable to selectively enable/disable such memory error checking (protection) scheme.

For instance, the data processing system in the technology described herein is in embodiments a data processing system that may be used to perform safety critical processing work but may also be used to perform non-safety critical processing work. Thus, depending on the particular use case, it may be appropriate (or not) to enable the memory protection scheme for a particular memory element (e.g. RAM). In that case, the technology described herein may thus be used to reduce energy consumption and/or improve performance when non-safety critical workloads are being processed.

Whether or not the processing element is used to perform safety critical processing work may be determined during configuration, e.g. depending on the customer's requirements. It could be the case that the processing system, once configured by a customer, is then always used for safety critical processing work. However, this need not be the case and in embodiments the processing units within the data processing system may be more dynamically configured. For example, in embodiments, a data processor or data processing system may include a plurality of processing elements and a controller that is operable to dynamically allocate processing elements of the plurality of processing elements into respective groups, or "partitions", of the processing elements, with different partitions potentially operating in different safety domains, e.g. as described in United States Patent Application Publication No. US-2024/0012673 A1 (Arm Limited), the entire contents of which is incorporated herein by reference. In that case, the technology described herein may allow for reduced energy consumption and/or improved performance for any processing elements that are included into partitions that are not executing safety critical processing work.

It is also the case that the (same) processing element may be used to execute different workloads, for example both graphics (fragment) tasks and neural and/or computer tasks (e.g. for computer vision processing), and these workloads may have different functional safety requirements. In that case, the memory error checking (protection) scheme can be, and in embodiments is, enabled on a task by task basis. Various arrangements would be possible in this regard.

Even if the processing element is not performing safety critical processing work it may still be desired to enable the memory error checking (protection) scheme for a particular memory element, e.g. to improve system reliability. For example, the memory error checking (protection) scheme may be used to allow defective silicon to still be used at least in some cases, i.e. by allowing any resulting errors to be suitably detected, and optionally also corrected, in the manner described above. If a particular memory element is free of defects, however, the memory error checking (protection) scheme is not needed, and so can be disabled.

Various arrangements would be possible in this regard.

In order to facilitate the operation according to the technology described herein, in embodiments it can be (and is) signalled (e.g. to the memory access interface circuit (unit)) whether or not the memory error checking (protection) scheme is enabled. This signalling can accordingly then be used to control the operation of the memory access logic within the memory access interface circuit (unit), e.g. in the manner described above. This signalling can take any suitable and desired form, depending on the configuration of the data processing system in question. For instance, a suitable flag may be set to indicate this.

Whilst embodiments are described above in relation to the overall data processing system, it will be appreciated that the technology described herein also extends to the novel and advantageous operation of the memory access circuit (unit) itself.

Thus, a further embodiment of the technology described herein comprises an apparatus comprising:

a memory element (e.g. a RAM), wherein the memory element comprises an access lane, wherein the access lane has a certain data width and is operable and configured to store within that data width a respective set of data bits and to also store within that data width an associated set of one or more error checking bits that are usable to implement a memory error checking (protection) scheme for the set of data bits, the error checking bits thus being stored in the access lane of the memory element together with the set of data bits for which the error checking bits are implementing the memory error checking (protection) scheme, and wherein the memory element is configured as a set of plural channels, each channel corresponding to a respective sub-portion of the access lane; and an associated memory interface circuit including memory access logic for controlling access to the respective memory element, wherein, when new data is to be written to a sub-portion of the access lane, the memory access logic is selectively controllable to perform different memory access operations, including:

a first access operation comprising reading the full data width of the access lane, thus including reading all of the data bits and the corresponding error checking bits, and then writing the new data into the full data width of the access lane together with an updated set of error checking bits based on the new data; and a second, different access operation in which the new data can be written to a selected one or more of the channels of the set of plural channels into which the access lane is configured.

Similarly, a yet further embodiment of the technology described herein comprises a method of accessing a memory element (e.g. a RAM), wherein the memory element comprises an access lane, wherein the access lane has a certain data width and is operable and configured to store within that data width a respective set of data bits and to also store within that data width an associated set of one or more error checking bits that are usable to implement a memory error checking (protection) scheme for the set of data bits, the error checking bits thus being stored in the access lane of the memory element together with the set of data bits for which the error checking bits are implementing the memory error checking (protection) scheme, and wherein the memory element is configured as a set of plural access lanes, each access lane corresponding to a respective sub-portion of the memory element, and wherein, when new data is to be written to a sub-portion of the access lane, memory access logic for the memory element is selectively controllable to perform different memory access operations, including:

a first access operation comprising reading the full data width of the access lane, thus including reading all of the data bits and the corresponding error checking bits, and then writing the new data into the full data width of the access lane together with an updated set of error checking bits based on the new data; and a second, different access operation in which the new data can be written to a selected one or more of the channels of the set of plural channels into which the access lane is configured, the method comprising:

when new data is to be written to a sub-portion of the access lane:

determining whether the memory access should be performed according to the first access operation or according to the second, different access operation.

It will be appreciated that these further embodiments of the technology described herein may, and in embodiments do, also contain any or all optional features of the technology described herein described herein. Thus, the apparatus and memory element of these further embodiments are in embodiments provided as part of an data processor and/or data processing system, as discussed above.

Thus, the determination as to whether to perform the first access operation or the second, different access operation is in embodiments based on whether or not a suitable memory error checking (protection) scheme that is being implemented in respect of the memory element is enabled.

For instance, as discussed above, if it is necessary to access the full data width, i.e. because the memory error checking (protection) scheme is enabled, the first access operation should be performed, and so this is in embodiments enforced to ensure that the full data width is accessed. Whereas, if this is not necessary, the second, different access operation may be performed.

Subject to the particular requirements of the technology described herein the data processing system may be any suitable data processing system and may therefore otherwise be operable and configured in any suitable and desired manner.

For example, the data processing system within which the technology described herein is applied may be any suitable and desired type of data processing system and the processing element may be any suitable and desired type of processing element within that data processing system. Thus, in some embodiments, it is a graphics processing system and the processing element is a graphics processor (or a processing element within a graphics processor). However, the technology described herein may generally be applied to any other suitable data processing systems and/or processing elements or units, as desired. Thus, in other embodiments, the processing element may be (part of) a "main" processor, e.g. a central processing unit (CPU), or may be (part of) a neural processing unit (NPU), a digital signal processor (DSP), an image signal processor (ISP), a dynamic memory access controller (DMA), or a display controller, for example. Various arrangements are contemplated in this regard.

Similarly, the particular memory element to which access is controlled in the manner of the technology described herein may be any suitable and desired memory element of or within the data processing system.

In this respect it will be appreciated that there may typically be various different types of memory elements within a data processing system and data processor. For example, a data processing system will typically have a "main" memory, which is typically implemented in DRAM. A given data processor within the data processing system may thus be operable to access such "main" or system memory. The data processor will, however, typically also comprise various internal memory elements, such as registers and local caches or buffers, with these typically being implemented in SRAM. For example, a graphics processor will typically have a programmable execution unit that has its own local register and cache. Similarly, a graphics processor may also have other dedicated (hardware) internal processing units, such as a tiling unit, a texture mapping unit, etc., and these internal processing units may also each have respective local storage implemented by way of suitable (e.g. SRAM) memory elements. In some embodiments, therefore, the memory element is an SRAM. In general, however, the technology described herein may be applied to any suitable such memory element within a data processing system and/or data processor, as desired.

In some embodiments, the technology described herein is applied to multiple, and in embodiments substantially all, of the internal memory elements within a particular data processor (e.g. a graphics processor) of the overall data processing system. Various other arrangements would however be possible in this regard depending on the configuration of the system in question (and which memory elements it is desired to provide memory error checking (protection) for).

As mentioned above, the memory element (or elements) for which the technology described herein is performed comprise an access lane that has a certain (fixed) data width (or size), which corresponds to the total number of bits available in the access lane, i.e. the number of data bits plus the number of error checking bits. The memory element may generally comprise a single access lane or a set of plural access lanes. In the latter case, each access lane typically has the same data width.

The access lane(s) may generally have any suitable and desired data width. The present Applicants recognise, however, that when adding memory error checking (protection) it may be beneficial for the memory error checking (protection) scheme to cover relatively larger data widths.

For example, for a typical single error correcting double error detecting (SECDED) scheme, 3 bits of data may use 4 error checking bits, whereas 32 bits of data may use 7 error checking bits, and 64 bits of data may use 8 error checking bits. Thus, it is generally more (area) efficient to apply such memory error checking (protection) schemes to larger chunks of data. In embodiments, therefore, the memory element has a data width greater than 16 bits, and in embodiments greater than 32 bits. In some embodiments, the memory element has a data width greater than 40 bits. For instance, various examples will be given below where the memory element has a data width of 44 bits or 45 bits but other examples would of course be possible.

(As mentioned above, this then means that when the memory error checking (protection) scheme is enabled, relatively wider accesses should correspondingly be performed so that the full (e.g. >32 bit) data width of the access lane is accessed in a single (same) memory access. Thus, if it is desired to write to less than the full data width of the access lane, it may be necessary to first perform an additional read of the full data width of the access lane in order to be able to perform the memory error checking (protection) operation, and this can be, and in embodiments is, done by performing the write using a read-modify-write operation as discussed above).

To facilitate the particular operation according to the technology described herein, as discussed above, the memory element is configured as a plurality of (distinct) channels, each channel corresponding to a respective sub-portion of the memory element. These channels should be, and therefore in embodiments are, equally sized. In embodiments, these channels correspond to 'strobe lanes' and so correspond to a sub-portion that can be accessed (i.e. written to) by a respective strobe.

In general, the memory element may be configured as any suitable and desired number of channels.

Further, the error checking bits within a particular access lane may be stored relative to the channels into which the access lane is configured in any suitable and desired manner.

For example, in one embodiment, there are plural error checking bits, and the access lane is configured such that the plurality of error checking bits are distributed across the set of plural of lanes into which the access lane is configured, each channel thus respectively operable to store both data bits and a respective (subset of) one or more of the error checking bits from the set of error checking bits. For instance, to give a particular example of such an arrangement, the access lane may be configured as four distinct channels, each channels operable to store 9 data bits and 2 error checking bits, such that the overall data width of the access lane is 44 bits.

In another embodiment, there are plural error checking bits, and the access lane is configured such that the plurality of error checking bits are stored in a respective (single) one of the channels into which the access lane is configured. For instance, in a particular example of such an arrangement, the access lane may be configured as five distinct channels, each channel operable to store 9 bits, with one of the channels storing a set of error checking bits and the other four channels storing a respective set of 9 data bits, such that the overall data width of the access lane is 45 bits.

Various other examples would of course be possible.

The memory error checking (protection) scheme that is used may be any suitable and desired memory error checking (protection) scheme and various examples exist in this regard.

For example, the memory error checking (protection) scheme that is used for a particular memory element may, e.g., and in embodiments does, comprise a suitable error checking and/or correcting code (ECC)-based protection scheme such as a single error correction (SEC) or single error correcting double error detection (SECDED), and subject to the particular requirements of the technology described herein such memory protection schemes may be implemented in any suitable and desired manner, e.g. in the normal manner for implementing such memory protection schemes.

Various examples of suitable ECC schemes exist that may be used in this respect, which ECC schemes are typically implemented by adding a number of redundant "error checking" code bits whose values are calculated as a function of the data (bits) in the portion of the memory that they are intended to protect and which error checking bits are thus updated whenever data is written to that portion of the memory, and are then used, when reading data from memory, to determine whether the data has been corrupted. Thus, when writing a chunk of data to memory, a suitable ECC encoder may calculate the appropriate data values for the error checking bits, and store the values of these error checking bits appropriately in association with the chunk of data. When that chunk of data is to be accessed, a corresponding ECC decoder may then re-calculate the appropriate error checking bit values from the chunk of data being accessed, and compare these with the stored error checking bit values to determine whether there is an error. The values of the error checking bits will thus be determined appropriately based on the scheme that is being used.

For example, in some embodiments, the memory error checking (protection) scheme comprises a single error detection (SED) scheme (i.e. capable of detecting a single bit flip) which can be implemented using a single parity bit that is computed as the XOR/XNOR of all of the other (data) bits in the associated chunk of data. In other embodiments, however, the memory error checking (protection) scheme may also be able to correct errors, at least when the error rate is low. For instance, single error correcting (SEC) codes may add a set of error checking bits that are usable to correct single bit errors, with each error checking bit code typically representing an XOR of a combination of a subset of the data bits. Extended Hamming codes can also be provided where an additional parity bit is used which allows the scheme to provide single error correction and double error detection (SECDED).

In this respect, it will be appreciated that the memory error "checking" (protection) scheme may be operable to detect errors (only), or may be operable to both detect and at least in some cases correct errors. Thus, the memory error checking (protection) scheme may generally comprise any suitable memory error detection and/or error correction scheme.

Any suitable and desired such SED, SEC or SECDED scheme may thus be used as the memory error checking (protection) scheme according to embodiments of the technology described herein (with the values of the error checking bits then being determined appropriately depending on the scheme that is being used).

Where the technology described herein is applied to multiple different memory elements these different memory elements may generally use the same or different memory error checking (protection) scheme and various arrangements would be possible in this regard.

As mentioned above, the memory error checking (protection) schemes in the technology described herein can be selectively enabled/disabled for a given memory element. This could be done for the data processing system as a whole, but in embodiments there is a finer-grained control where memory error checking (memory protection) can be selectively enabled/disabled for particular memory elements and/or for particular processing units, etc., depending on whether or not it is advantageous to provide such memory error checking (protection). This would then allow memory error checking (protection) to be provided where desired (e.g. in the case of use in a safety critical environment), but avoid its use in those circumstances where it is not required.

In some embodiments, the memory error checking (protection) may be selectively enabled/disabled for a given output to be generated by a processing unit. This would then allow further finer-grained control over when memory error checking (protection) is provided. In that case, this operation may be controlled, e.g., by a (software) driver for the processing unit, or an appropriate hypervisor, or "arbiter" which controls access to the processing unit.

The, e.g. driver, may be able to recognise when the memory error checking (protection) scheme is required (and so should be enabled) in any suitable and desired manner. For example, and in an embodiment, an application that requires processing by the processing unit could be configured to and operable to be able to indicate when memory error checking (memory protection) is required. This could be achieved, for example, and in an embodiment, by providing an appropriate API extension, whereby an application programmer can indicate that operation in the manner of the technology described herein is desired.

Other arrangements would, of course, be possible.

Thus, according to the technology described herein, the memory error checking (protection) scheme can be selectively enabled in respect of a given memory element and/or processing element (or processor), e.g., and in an embodiment, on an output-by-output basis. When the memory error checking (protection) scheme is enabled for a particular memory element (processing element, processing output, etc.), the error checking bits are thus used to implement the memory error checking (protection) scheme, e.g. as described above.

On the other hand, when the memory error checking (protection) scheme is not enabled for a particular memory element, the error checking bits may be set as desired. Therefore, the error checking bits are in embodiments set (and used) appropriately to (try to) improve the overall memory access operations.

Various arrangements would be possible in this regard.

For instance, in embodiments, when the memory error checking (protection) scheme is not enabled for a particular memory element, the error checking bits may be set appropriately, e.g. during an initialisation (memory write) process, to a particular same value that will require less energy to read to (try to) reduce energy consumption associated with subsequent (read) accesses to that memory element. For example, in order to read from a memory element, it may be desired to "pre-charge" the memory element. In that case, during the read operation, when determining the address to be read from, the relevant row is selected (using the address) and that row is then pre-charged. When reading the data, the pre-charged lines may then be connected to memory cells and the logic level compared to a pre-charged line that isn't being accessed (with the difference then being used to determine the data value of interest). This "pre-charging" may thus be performed as part of the read operation.

The present Applicants recognise that for a given memory element it may consume more energy to read a 1 or a 0 depending upon whether the output is inverted or not.

Thus, when the error checking bits are not needed for implementing the memory error checking (protection) scheme (i.e. because it is not enabled for the memory element in question), the error checking bits can accordingly be, and in embodiments are, all set appropriately when initialising (or writing to) the memory element to 1 or 0 depending on which value can be more efficiently read. Thus, if the memory element is configured such that it is more energy efficient to read a 1, the error checking bits may be set to 1, whereas if it is more energy efficient to read a 0, the error checking bits may accordingly be set to 0. In this way, a subsequent read access will then consume less energy.

It is believed that this setting of the error checking bits, when not needed for implementing the memory error checking (protection) scheme (i.e. because it is not enabled for the memory element in question), to initialise or "pre-charge" the memory element is novel and advantageous in its own right.

Thus, according to another embodiment of the technology described herein, there is provided a method of initialising (writing) a memory element access lane (e.g. an access lane within a RAM or SRAM memory element) for subsequent memory accesses, wherein the memory element access lane has a certain data width and is operable and configured to store within that data width a respective set of data bits and to also store within that data width an associated set of one or more error checking bits that are usable to implement a memory error checking (protection) scheme for the set of data bits, the error checking bits thus being stored in the memory element access lane together with the set of data bits for which the error checking bits are implementing the memory error checking scheme, wherein the memory error checking (protection) scheme
      can be selectively enabled in respect of the memory
      element, and wherein the method comprises:
    when the memory error checking (protection) scheme is
      not enabled in respect of the memory element:
    setting the value of each of the error checking bits in the
      set of error checking bits to a same value, the same
      value being whichever of 0 or 1 it is more efficient to
      read from the memory element access lane.

It will be appreciated that this other embodiment of the technology described herein relating to initialising of the memory element may, and in embodiments does, also contain any or all optional features of the technology described herein described herein. Thus, the memory element that is being initialised according to this embodiment may, and in embodiments does, correspond to a memory element of an apparatus or data processing system as discussed above, and for which access may therefore be controlled in the manner described above in relation to the earlier embodiments of the technology described herein.

Thus, in embodiments, the memory element access lane is configured as a set of plural channels, each channel corresponding to a respective sub-portion of the memory element access lane, e.g. as described above.

In that case, the set of error checking bits may include a plurality of error checking bits that are distributed across the set of plural of channels into which the memory element access lane is configured, each channel thus respectively operable to store both data bits and a respective one or more error checking bits from the set of error checking bits. When the memory error checking scheme is not enabled in respect of the memory element, the method may thus comprise writing the said same value for each of the error checking bits stored within that channel whenever data is to be written to a particular one of the channels into which the memory element access lane is configured. That is, each time a write is performed to a particular channel, the same said value should be (and so in embodiments is) written for each of the error checking bits stored within that channel.

In other embodiments, however, as mentioned above, the set of error checking bits may be stored within a respective one of the channels into which the memory element access lane is configured. In that case, once the memory access channel has been initialised and the values of the error checking bits set to the desired value, so long as the memory error checking (protection) scheme remains disabled, the values of the error checking bits may not need to be changed, and in embodiments are therefore not changed. Thus, in that case, the method may comprise initially setting the value of each of the error checking bits in the set of error checking bits to said same value; and then controlling subsequent writes such that the respective one of the channels that stores the error checking bits is not written to.

Various other arrangements would be possible in this regard.

Subject to the requirement to be operable in accordance with the technology described herein, the processing element (or elements) of the data processing system may otherwise comprise any or all of the normal components, functional units, and elements, etc., that such a processing element may comprise. Each processing element may have the same set of functional units, etc., or some or all of the processing elements may differ from each other.

As well as the processing elements, memory elements, memory interface circuit (unit), etc., for operation in the manner of the technology described herein, the data processing system may otherwise include any other suitable and desired components, elements, units, etc., that a data processing system may comprise.

Thus, the data processing system may, e.g., include one or more peripheral devices, such as one or more output devices (e.g. display screens, vehicle controllers, etc.), and/or one or more input devices (e.g. human-computer interfaces, vehicle sensors, etc.).

In embodiments, where the data processing system includes a plurality of processing units (which may either be operated independently of each other or in combination), each processing unit can in embodiments receive processing instructions, e.g. from a (driver that is executing on a) host processor or virtual machine that requires the data processing output, and carry out received instructions independently. For example, each processing unit in embodiments has an associated (task) management circuit (e.g. job manager) that can provide a suitable software interface for the processing unit when operating in standalone mode.

In embodiments at least some of the processing units can also be operated in combination.

The virtual machines (host processors) may have access to the same set of one or more peripheral devices, or, e.g., a separate set of peripheral devices may be provided for different groups of virtual machines (again, this may be beneficial for safety and/or security purposes).

The overall data processing system in embodiments includes appropriate (system) memory for storing the data used by the processing units when carrying out processing and/or for storing the data generated by the processing units as a result of carrying out processing. Different groups of processing units may be configured to be connected to the same (system) memory, or separate system memories may be provided for different groups (again, this may be beneficial for safety and/or security purposes).

Correspondingly, different groups of the processing units may be connected to the external system memory via the same or different memory interconnects.

Thus, in an embodiment, the data processing system includes the processing units, and one or more host data processing units (processors) (e.g. central processing units) on which one or more virtual machines execute (in embodiments together with one or more drivers (for the processing units)).

In an embodiment, the data processing system and/or data processing units comprise, and/or are in communication with, one or more memories and/or memory devices that store the data described herein, and/or that store software for performing the processes described herein.

In one embodiment, the various functions of the technology described herein are carried out on a single system on chip (SoC) data processing system.

The technology described herein can be implemented in any suitable system, such as a suitably operable microprocessor based system. In some embodiments, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuits, circuitry, processing logic, microprocessor arrangements, etc., that are operable to perform the various functions, etc., such as appropriately dedicated hardware elements (processing circuits) and/or programmable hardware elements (processing circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits, etc., if desired.

Subject to any hardware necessary to carry out the specific functions discussed above, the data processing system and graphics processor can otherwise include any one or more or all of the usual functional units, etc., that data processing systems and graphics processors include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a processor or processors, a computer program element comprising computer software code portions for performing the methods herein described when the program element is run on a processor or processors, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

FIG. 1 shows an exemplary data processing system 100 that can be operated in accordance with the embodiments of the technology described herein.

As shown in FIG. 1, the data processing system 100 includes a central processing unit (CPU) 102, a graphics processor (graphics processing unit) (GPU) 101, and a display controller 103 (coupled to a display panel 104), that communicate via an interconnect 105. The central processing unit (CPU) 102, graphics processor (graphics processing unit) (GPU) 101, and display controller 103 also have access to off-chip memory 130 for storing, inter alia, frames to be displayed, via a memory controller 106.

In use, the graphics processor (graphics processing unit) (GPU) 101 will, for example, generate a sequence of frames for display, which are stored via the memory controller 106 in a frame buffer in the off-chip memory 130. Then, when the frames are to be displayed, the display controller 103 will read the frames from the frame buffer in the off-chip memory 130 via the memory controller 106 and send them to a display panel 104 for display.

It will be appreciated that the graphics processor (graphics processing unit) (GPU) 101 may also be used for other, non-graphics purposes, for example for general purpose compute and/or machine learning, e.g. in the normal manner for such a graphics processor (graphics processing unit) (GPU) 101, and so the graphics processor (graphics processing unit) (GPU) 101 is not limited to generating frames for display.

Although FIG. 1 only shows a single graphics processor (graphics processing unit) (GPU) 101 it will be appreciated that the data processing system 100 may generally include more than one graphics processor (graphics processing unit) (GPU), e.g. arranged in a group, e.g. and operable either independently or in combination. Likewise the system in FIG. 1 only shows certain elements of a data processing system but the data processing system may generally contain any other desired units that a data processing system may comprise.

Figure 2:
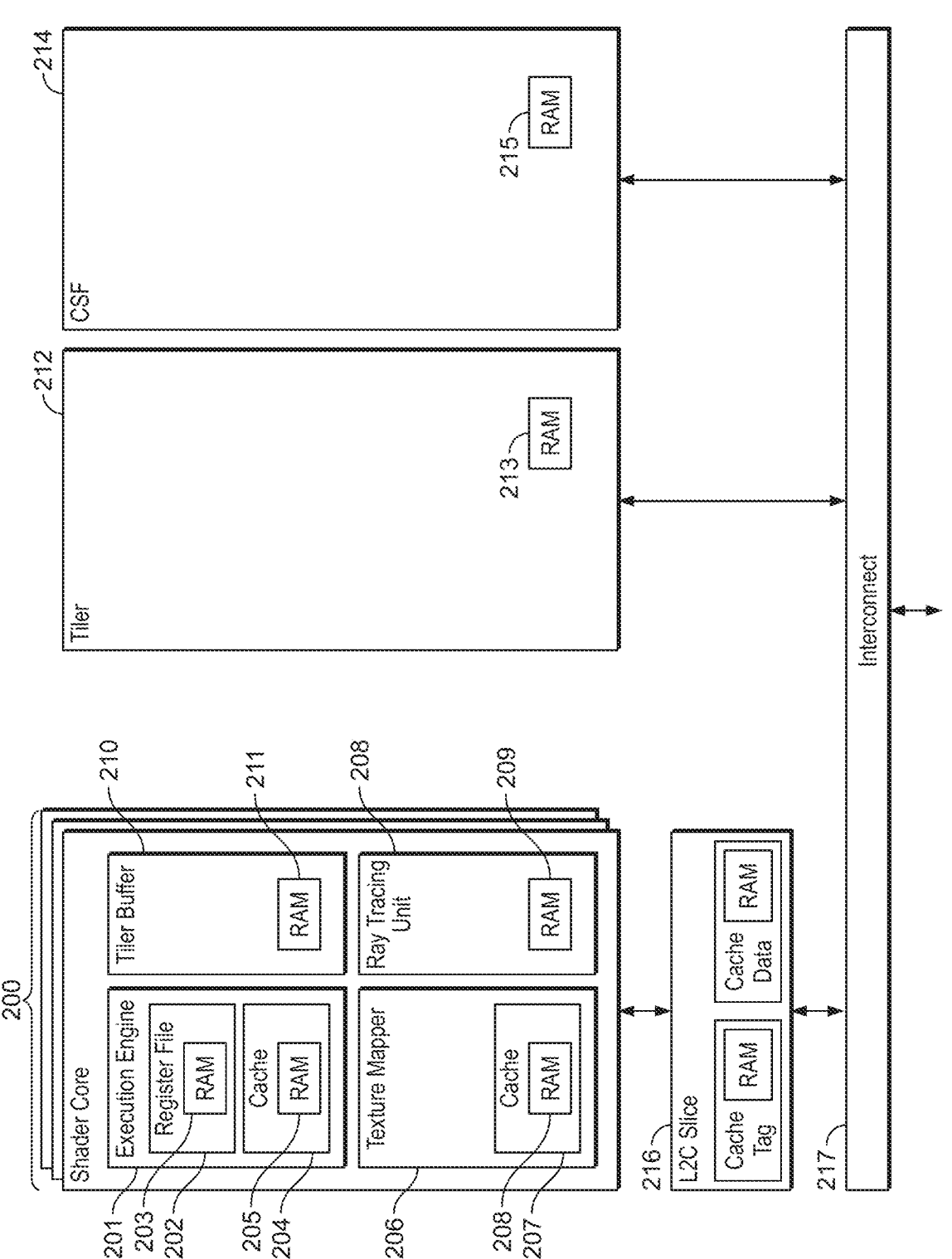
FIG. 2 shows schematically an embodiment of a graphics processor (graphics processing unit) (GPU)

FIG. 2 shows in more detail an embodiment of a graphics processor (graphics processing unit) (GPU) (such as the graphics processor (graphics processing unit) (GPU) 101 in FIG. 1).

As shown in FIG. 2, the graphics processor (graphics processing unit) (GPU) includes one or more shader (processing) cores 200 that are provided along the same interconnect 217 (which interconnect 217 provides communication to a shared (L2) cache 216 which is operable to communication with the off-chip memory system of the data processing system that the graphics processor (graphics processing unit) (GPU) is a part of).

A command processing circuit (in the form of a command stream frontend, "CSF") 214 is also provided that is operable to communicate over the interconnect 217 with the respective shader (processing) cores 217 to schedule processing jobs.

Although not shown in FIG. 2, a shader (processing) core may thus comprise a suitable shader core "endpoint" that is operable to schedule processing work to the execution engine (EE) 201 and corresponding fragment thread creation circuitry that is operable to generate appropriate execution threads for execution by the execution engine (EE) 201 as desired.

The command stream frontend 214 may thus issue processing jobs to the shader core endpoint of a respective shader core accordingly to cause the shader (processing) core to perform desired processing work. The command stream frontend 214 may generally be able to schedule any desired processing work for the graphics processor, including geometry, fragment, compute and neural network processing work.

In the present embodiments the graphics processor (graphics processing unit) (GPU) is operable to perform tile-based rendering and so also includes a separate tiler unit

212 that is also operable to communicate over the interconnect 217 with the respective shader (processing) cores 217 to perform tiling operations.

As shown in FIG. 2, a graphics processor shader (processing) core comprises a programmable processing unit (circuit) in the form of an execution engine (EE) 201 that perform processing operations by running small programs (often referred to as "shader" programs) for each "item" in an output to be generated such as a render target, e.g. frame. (An "item" in this regard may be, e.g. a vertex, one or more sampling positions, a portion of a computation job, etc.) The shader core will process each "item" by means of one or more execution threads which will execute the instructions of the shader program(s) in question for the "item" in question. Typically, there will be multiple execution threads each executing at the same time (in parallel).

To facilitate these operations, the execution engine (EE) 201 in FIG. 2 includes a register file 202 including RAM 203 and a cache 204 including RAM 205.

In addition to the programmable execution engine (EE) 201 the graphics processor shader (processing) core in FIG. 2 also includes a number of dedicated (substantially fixed-function) units that can be triggered by the execution engine (EE) 201 to perform certain processing operations as part of shader program execution. For instance, the execution engine (EE) 201 in FIG. 2 includes a dedicated texture mapper (unit) 206 that is operable to perform graphics texturing operations. The texture mapper (unit) 206 includes a texture cache 207 and RAM 208. The execution engine (EE) 201 in FIG. 2 also includes a dedicated ray tracing unit 208 including RAM 209 and a tiler buffer 210 including RAM 211 for supporting tile-based processing.

FIG. 2 shows schematically the relevant configuration of one shader (processing) core, but as will be appreciated by those skilled in the art, any further shader (processing) cores of the graphics processor may be configured in a corresponding manner (but may also be configured in a different manner).

As will be appreciated by those skilled in the art there may be other elements of the graphics processor that are not illustrated in FIG. 2. For example, although not shown in FIG. 2, a shader (processing) core may also include a neural engine (NE), which performs machine learning tasks.

It should also be noted here that FIG. 2 is only schematic, and that, for example, in practice the shown functional units may share significant hardware circuits, even though they are shown schematically as separate units in FIG. 2. It will also be appreciated that each of the elements and units, etc., of the graphics processor as shown in FIG. 2 may, unless otherwise indicated, be implemented as desired and will accordingly comprise, e.g., appropriate circuits (processing logic), etc., for performing the necessary operation and functions.

The graphics processor (graphics processing unit) (GPU) as shown in FIG. 2 thus includes various internal memories (RAMs) that may be used to locally store data for the various functional units of the graphics processor (graphics processing unit) (GPU).

Figure 3:
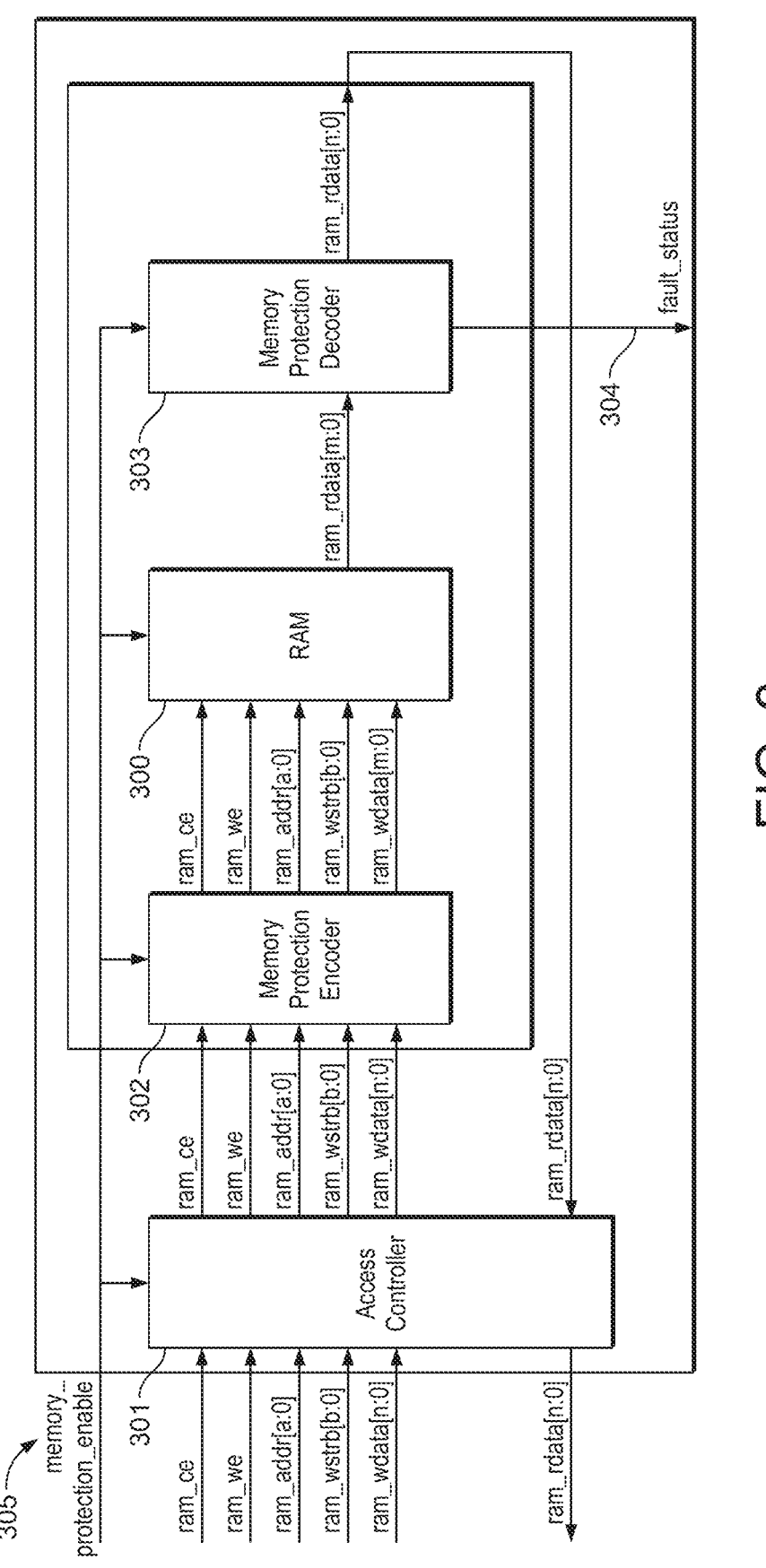
FIG. 3 shows schematically further details of memory access logic according to an embodiment.

Each of these internal memories (RAMs) may have a respective memory access interface (controller) that controls access to that memory. This is shown schematically in FIG. 3. In particular, as shown in FIG. 3, appropriate memory "error checking" protection is provided. Thus, when writing data to a particular memory (RAM) 300, the access interface (controller) 301 for that memory (RAM) 300 issues an appropriate write transaction, and this write transaction is first processed by a suitable memory protection encoder 302.

The encoded data is then stored appropriately in the memory (RAM) 300, e.g. at the address specified by the write transaction. Correspondingly, when data is read from the memory (RAM) 300, the access interface (controller) 301 issues an appropriate read transaction, and the read data is first passed through a suitable memory protection decoder 303 before being returned to the access interface (controller) 301. The memory protection decoder 303 is operable to perform a suitable error check and when an error is detected, a fault 304 is reported. Whereas, if no error is detected, the data is returned appropriately to the to the access interface (controller) 301.

The access interface (controller) 301 may also be operable to issue read-modify-write transactions, for example, as will be explained further below.

The access interface (controller) 301 is thus operable to issue various memory access transactions to the memory (RAM) 300, but these memory access transactions are protected by the operation of the memory protection circuitry (i.e. the memory protection encoder 302/decoder 303).

Thus, in the present embodiments, an appropriate memory error checking protection scheme is used to mitigate against memory errors. Various suitable memory protection schemes may exist in this regard but in the present embodiments a suitable error checking and/or correcting ("ECC") code is used that is operable to detect and in embodiments correct single-bit memory errors. To implement this, an appropriate sets of ECC bits are thus provided, which ECC bits are calculated over the other (data) bits in the memory (RAM) 300, e.g. in the normal manner for implementing such ECC schemes.

In the present embodiments, these ECC bits are stored within the memory (RAM) 300, alongside the data bits (e.g. rather than providing a separate dedicated RAM for the ECC bits). In order to reduce the area overhead of adding such memory protection, the memory (RAM) 300 is correspondingly widened so that the ECC bits cover a relatively larger number of data bits.

Figures 4, 5:
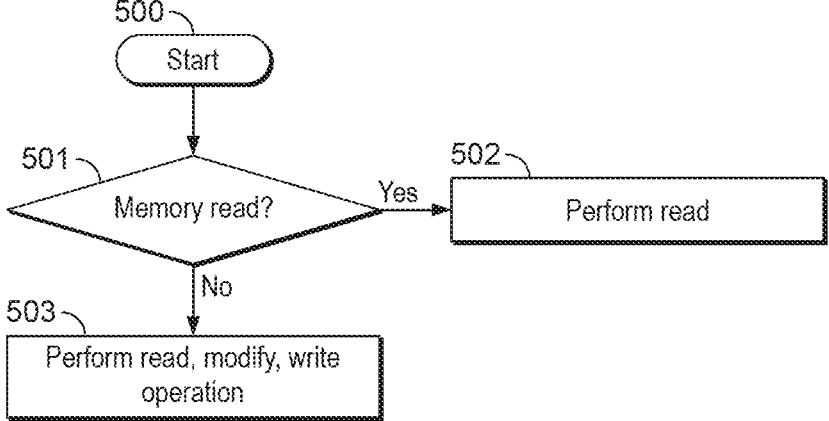
FIG. 4 shows an example of a RAM configuration in which the RAM is extended to store memory protection bits alongside the data bits.
FIG. 5 is a flow chart showing how memory access operations may be performed for the RAM configuration in FIG. 4.

For example, FIG. 4 shows an example of a RAM having 36 data bits and 7 ECC bits (43 bits in total). In order to perform the memory error checking protection operation, it is necessary to access full data width of the RAM (i.e. the full 43 bits) so that all of the data bits and error checking bits are accessed. Thus, in this case, all memory accesses should be, and are, performed as 43-bit accesses. For read operations, the read operation will thus read the full 43-bit data width. For write operations, it is necessary to first read the full 43-bit data width, and so write operations are performed as (43-bit) 'read-modify-write' operations.

FIG. 5 shows the memory access operations to the RAM in FIG. 4 according to a more traditional approach. In this case, when a memory access is to be performed (step 500), if the memory access is a memory read (step 501—yes), the read operation is then performed accordingly (step 502), i.e. by setting the full 43-bit data width as the address on the read data bus, and then reading the data accordingly. On the other hand, if the memory access is not a memory read (step 501—no), i.e. data is to be written to the RAM, this is then performed as a 43-bit read-modify-write operation (step 503).

The more traditional approach for implementing ECC memory protection described above in relation to FIG. 4 and FIG. 5 thus works well in terms of reducing area overhead of adding the memory protection but it will be appreciated that performing writes as read-modify-write operations will consume more energy compared to performing standard writes and introduce additional processing cycles.

As mentioned above, however, a graphics processor and graphics processing system may generally be used both for safety critical and non-safety critical workloads. In this regard, a graphics processing system may be configured to perform these different workloads at different times, or could be operable and configured to perform both workloads contemporaneously. For example, this could be done by providing a single graphics processor (processing system) that is time shared between the different processing functions that are required, or by allowing different portions of the graphics processing system to perform different workloads. Further, there are other reasons why memory error checking protection may or may not be desired, e.g. to increase reliability or mitigate manufacturing defects.

According to the present embodiments, therefore, the memory error checking protection scheme can be selectively enabled/disabled and this can in embodiments be done on a per-memory (RAM) basis. Thus, as shown in FIG. 3, in the present embodiments it can be appropriately signalled 305 to the access controller 301 for a particular memory (RAM) 300 whether (or not) memory protection is enabled for that particular memory (RAM) 300.

This then allows the access controller 301 to be selectively controlled to perform different memory access operations depending on whether (or not) memory protection is enabled, which can then provide a more efficient operation (especially in the case where memory protection is not enabled and so it may not be necessary or appropriate to force wider writes).

For example, in the present embodiments, as was the case in FIG. 4, the ECC bits are stored within the same RAM as the data bits. However, the RAM is now configured as a plurality of (distinct) channels ('strobe lanes'), thus facilitating finer-grained access to the RAM. In this respect, in general, it will be understood that the RAM should be configured as a set of equally-sized channels. Various arrangements would be possible in this regard.

For instance, in the example shown in FIG. 6, the RAM is configured as four (distinct) channels each capable of storing 11 bits, with 9 bits for storing data and 2 bits for storing the ECC bits. Thus, the RAM in this example is 44-bits wide (with 1 bit being unused, since in this example only 7 ECC bits are required). When the memory protection is enabled, all four channels should be accessed in a single same transaction. When the memory protection is not enabled, however, it is not necessary to access all the channels, and the access can instead be performed (only) to the channel or channels of interest. Similarly, when the memory protection is not enabled, it is not necessary to perform a read-modify-write operation in order to write a particular channel. This can therefore reduce energy consumption (and potentially increase throughput by avoiding having to perform writes as read-modify-write operations when it is not necessary to do so).

As another example, as shown in FIG. 7, the RAM is configured as five (distinct) channels each capable of storing 9 bits, with four of the channels being used for storing data and one of the access lanes being used for storing the ECC bits. Thus, the RAM in this example is 45-bits wide (with 2 bits being unused, again since only 7 ECC bits are required in this example). When the memory protection is enabled, all five channels should therefore be accessed in a single same transaction. On the other hand, when the memory protection is not enabled, it is not necessary to access all the channels, and the access can instead be performed (only) to the channel or channels of interest. Again, therefore, this can reduce energy consumption and/or improve performance at least in the case that the ECC scheme is not required.

Various other examples would of course be possible.

The memory access logic according to the present embodiments should therefore, and does, drive all of the channels when the memory protection is enabled, but when the memory protection is not enabled only the required channels are driven. Further, when data is to be written to a sub-portion of the RAM, this can be done by writing data to the desired channel (or channels), e.g. using strobes, rather than having to perform a read-modify-write operation.

In the present embodiments, therefore, when memory protection is enabled, it is still appropriate to access the full data width of the RAM, i.e. to access all of the channels in a single same transaction, and so this is done. In that case, as discussed above, if writing sub-word level data, it may therefore still be necessary to do this as a read-modify-write transaction. However, when memory protection is not enabled, it is not necessary to access all of the channels in a single transaction, and so in the present embodiments, access can be performed to individual channels, as required.

Figure 8:
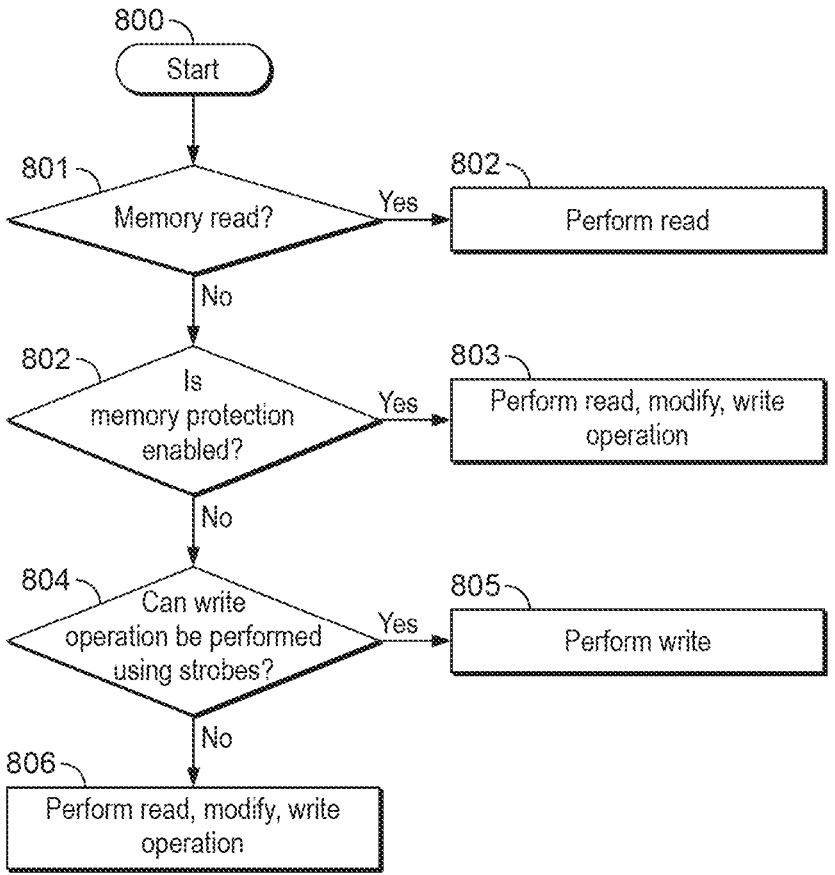
FIG. 8 is a flow chart showing how memory access operations may be performed according to embodiments depending on whether or not memory protection is enabled.

FIG. 8 is a flow chart showing how memory access operations may be performed for a particular RAM depending on whether (or not) memory protection is enabled for that particular RAM (e.g. as may be determined based on the signalling 305, as shown in FIG. 3).

As shown in FIG. 8, for a memory access (step 800), it is first determined whether the access is a memory read. If so (step 801—yes), the read operation is then performed (step 802) to read the required data from the relevant address within the RAM. Thus, in the case that the memory error checking protection is enabled, the full data width is read. Whereas, in the case that the memory error checking protection is not enabled, the read is performed only over the address storing the required data (i.e. without having to read the full data width).

If the access is not a memory read (step 801—no), it is then checked whether or not the memory protection is enabled. If it is (step 802—yes), the memory access should then be, and is, performed using a read-modify-write operation (step 803), in the same manner described above. On the other hand, if the memory protection is not enabled (step 802—no), it is not necessary to access the full data width and so the memory access can be performed differently. Thus, as shown in FIG. 8, it is then checked whether the write access can be performed using strobes. If so (step 804—yes), the write access is performed using a standard write transaction (step 805).

Thus, if the memory protection is not enabled, only if the write access cannot be performed using strobes (or it is inefficient to do so) (step 804—no) is it necessary to perform a read-modify-write operation (step 806).

This can therefore provide an overall more efficient operation for memory accesses in data processing system in which memory protection may be selectively enabled/disabled, in particular by reducing energy consumption and/or increasing performance in the case where the memory protection is not enabled.

It will also be appreciated that in the case where memory protection is not enabled, the ECC bits are not then needed to implement the memory protection scheme, and so may be used for other purposes, as desired.

Figure 9:
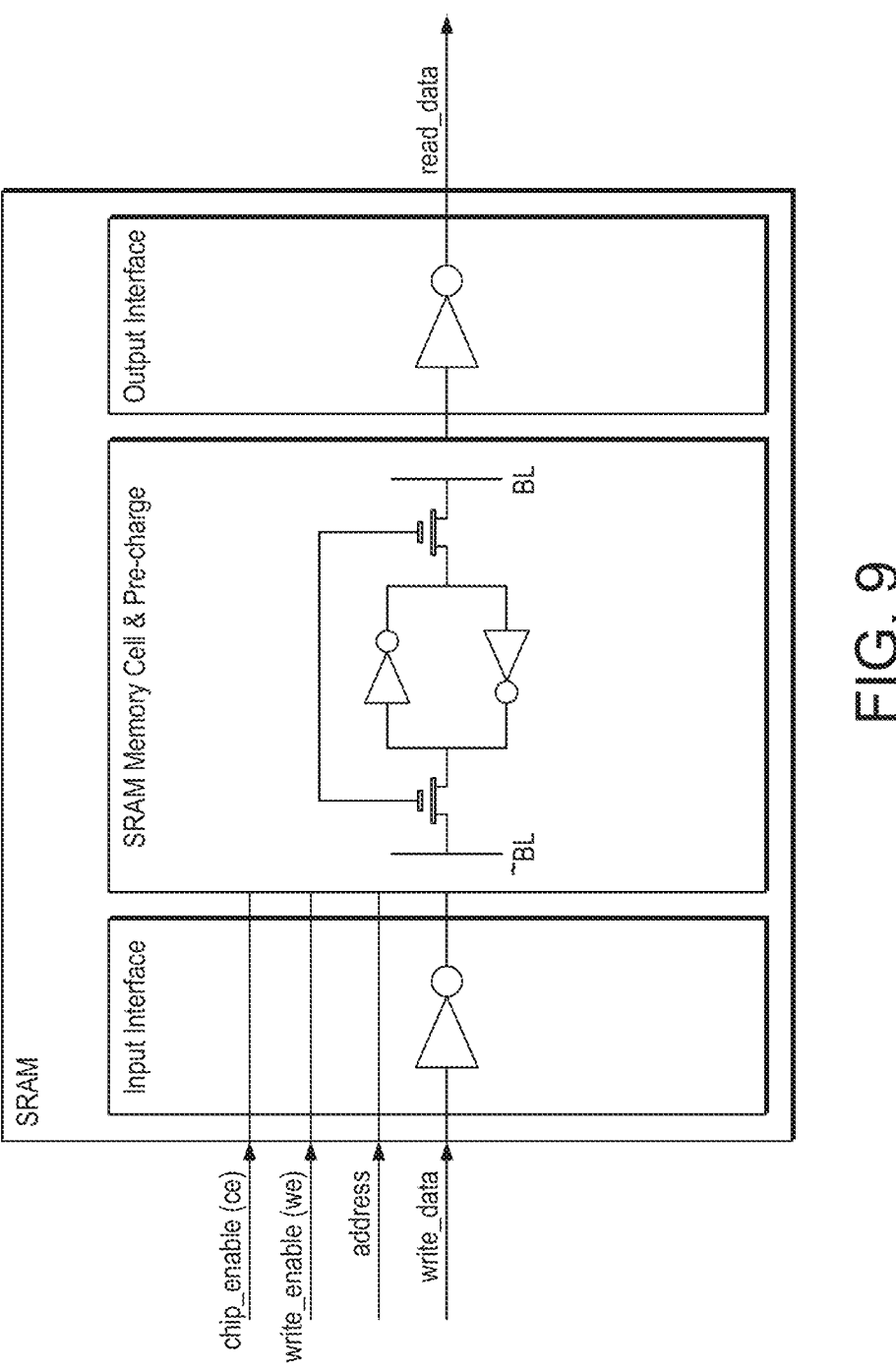
FIG. 9 shows an example of an SRAM with inverting output.
Figure 10:
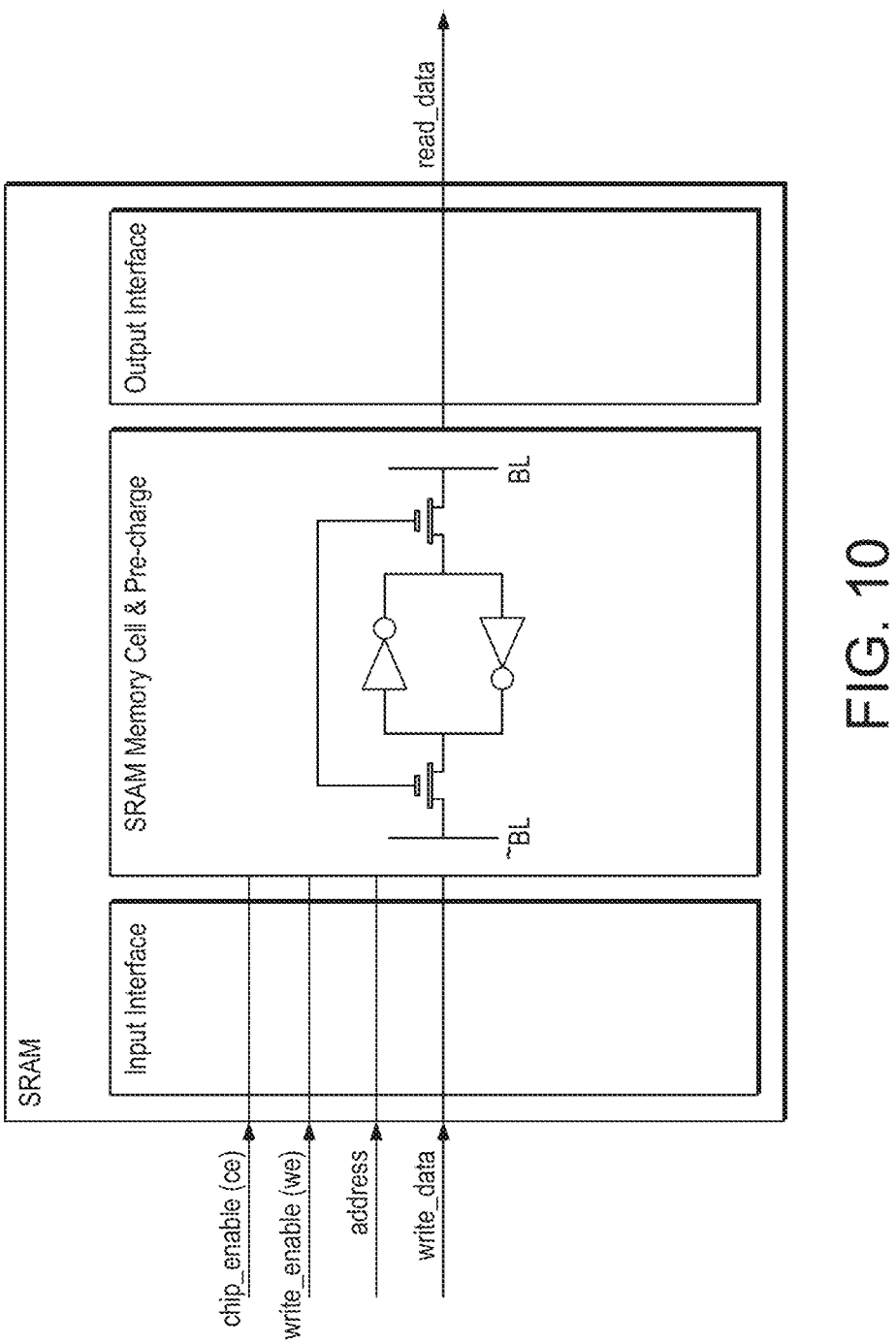
FIG. 10 shows an example of an SRAM without inverting output.

An example of this would be for "pre-charging" the RAM. For instance, it may consume more energy to read a 1 or a 0 depending on whether the output is inverted or not. In this regard, FIG. 9 shows an example of SRAM with inverting output. FIG. 10 shows a corresponding example of SRAM without inverting output.

Thus, where memory protection is supported, but not enabled, suitable information can be provided (e.g. using tie offs, or by configuration such information in the design, for example by using 'define in the Register Transfer Language (RTL) description of the design, etc.) to ensure that when the RAM is being initialised the ECC bits are always written to whichever of 1 or 0 consumes less energy to read (i.e. to a lower power state). This then means that subsequent reads from the RAM will consume less energy.

Figure 11:
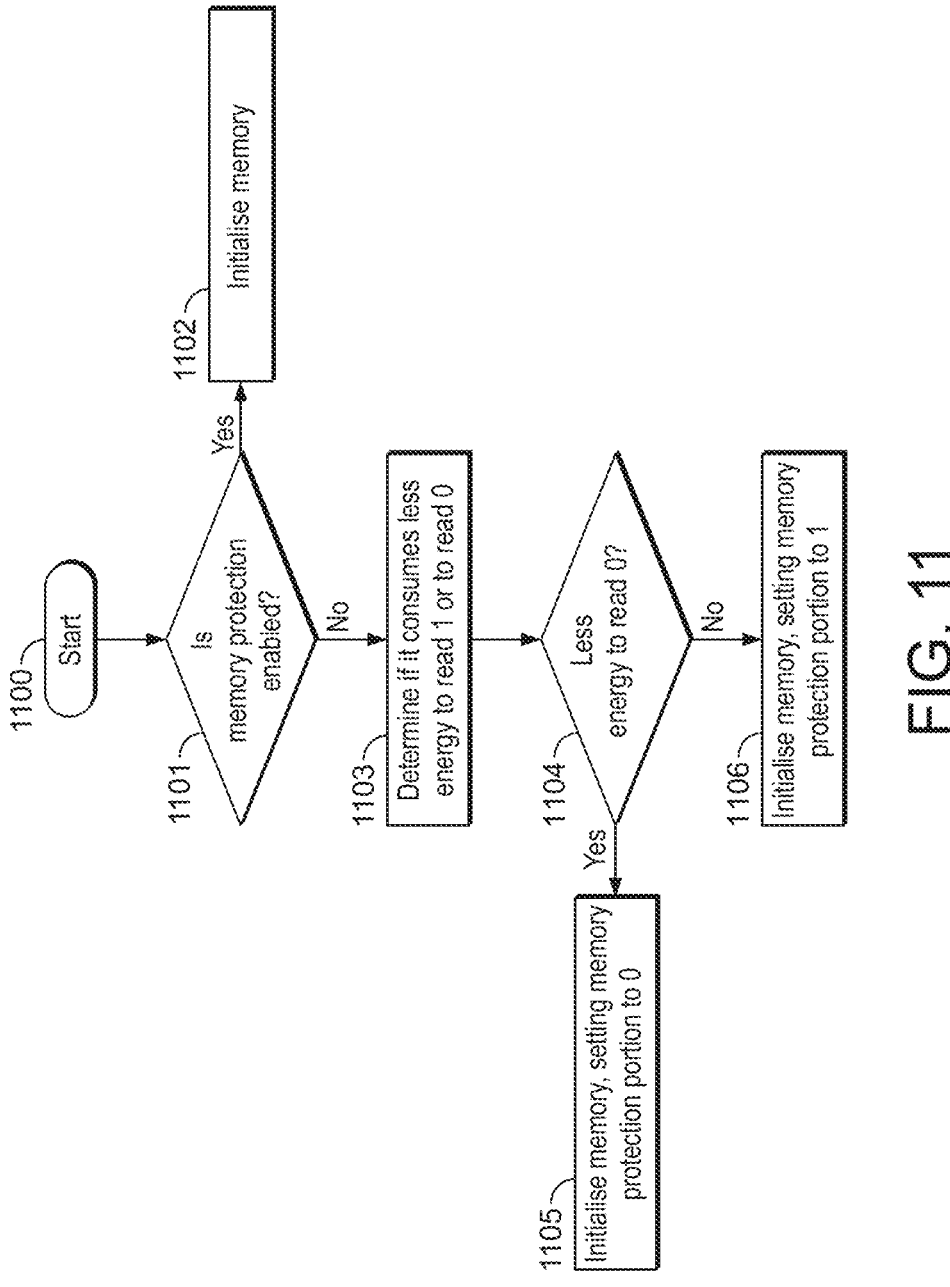
FIG. 11 is a flow chart showing an initialization process according to an embodiment.

FIG. 11 is a flow chart showing an initialization (writing) process according to an embodiment. As shown in FIG. 11, when it is desired to pre-charge the RAM (step 1100), it is first determined whether or not the memory protection is enabled. If yes (step 1101—yes), the ECC bits are required to implement the memory protection scheme, and so the memory initialisation is performed as normal (step 1102). On the other hand, if the memory protection is not enabled (step 1101—no), a determination is then made as to whether it consumes less energy to read 1 or to read 0 (step 1103). This determination is then used to initialise the memory.

For instance, if it consume less energy to read 0 (step 1104—yes), the memory is initialised, setting all of the ECC bits to 0. On the other hand, if it consumes less energy to read 1 (i.e. step 1104—no), the memory is initialised, setting all of the ECC bits to 1. In this way, the (unused) ECC bits are used to initialise the memory in such a way that reduces energy consumption for subsequent reads.

In this case, if the ECC bits are stored in a respective channel, e.g. as shown in FIG. 7, once that channel has been suitably initialised (i.e. by setting the bit values for the ECC bits to 0 or 1 as appropriate), that channel may not then be written to on subsequent write accesses, as the values should stay the same. Whereas, the ECC bits are distributed through the RAM, e.g. as shown in FIG. 6, each subsequent write may write the appropriate data value to the ECC bits.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein described herein, in various embodiments and with various modifications as are suited to the particular use contemplated. It is intended that the scope be defined by the claims appended hereto.

The invention claimed is:

1. An apparatus comprising:
a memory element, wherein the memory element comprises an access lane, wherein the access lane has a certain data width and is configured to store within that data width a respective set of data bits and to also store within that data width an associated set of one or more error checking bits for implementing a memory error checking scheme for the set of data bits, the error checking bits thus being stored in the access lane of the memory element together with the set of data bits, and wherein the access lane is configured as a set of plural channels, each channel corresponding to a respective sub-portion of the access lane; and
an associated memory interface circuit including memory access logic for controlling access to the respective memory element, wherein, when new data is to be written to a sub-portion of the access lane, the memory access logic is selectively controllable to perform different memory access operations, including:
(i) a first access operation comprising reading the full data width of the access lane, thus including reading all of the data bits and the corresponding error checking bits, and then writing the new data into the full data width of the access lane together with an updated set of error checking bits based on the new data; and
(ii) a second, different access operation in which the new data is written to a selected one or more of the channels of the set of plural channels into which the access lane is configured.

2. The apparatus of claim 1, wherein the access lane has a data width greater than 16 bits.

3. The apparatus of claim 2, wherein the access lane has a data width greater than 32 bits.

4. The apparatus of claim 1, wherein the number of data bits stored within the access lane is at least twice the number of error checking bits stored within the access lane.

5. The apparatus of claim 1, wherein the set of error checking bits includes a plurality of error checking bits, and wherein the access lane is configured such that the plurality of error checking bits are distributed across the set of plural of channels into which the access lane is configured, each channel thus respectively configured to store both data bits and a respective one or more error checking bits from the set of error checking bits.

6. The apparatus of claim 1, wherein the set of error checking bits includes a plurality of error checking bits, and wherein the access lane is configured such that the respective set of error checking bits is stored in a respective one of the channels into which the access lane is configured.

7. The apparatus of claim 1, wherein the first access operation is performed as a read-modify write operation.

8. A data processing system comprising:
at least one processing element;
a respective memory element that the at least one processing element is configured to access when performing its processing, wherein the memory element comprises an access lane, wherein the access lane has a certain data width and is configured to store within that data width a respective set of data bits and to also store within that data width an associated set of one or more error checking bits for implementing a memory error checking scheme for the set of data bits, the error checking bits thus being stored in the access lane together with the set of data bits, and wherein the access lane is configured as a set of plural channels, each channel corresponding to a respective sub-portion of the access lane; and
an associated memory interface circuit including memory access logic for controlling the at least one processing element's access to the respective memory element,
wherein the memory error checking scheme can be selectively enabled in respect of the memory element, and
wherein, when new data is to be written to a sub-portion of the access lane, the memory access logic is configured to perform different memory access operations depending on whether or not the memory error checking scheme is enabled, wherein:
when the memory error checking scheme is enabled, the memory access logic is configured to perform a first access operation comprising reading the full data width of the access lane, thus including reading all of the data bits and the corresponding error checking bits, and then writing the new data into the full data width of the access lane together with an updated set of error checking bits based on the new data, whereas when the memory error checking scheme is not enabled, the memory access logic is operable to perform a second, different access operation in which the new data is written to a selected one or more of the channels of the set of plural channels into which the access lane is configured.

9. The data processing system of claim 8, wherein the respective memory element has a data width greater than 16 bits.

10. The data processing system of claim 9, wherein the respective memory element has a data width greater than 32 bits.

11. The data processing system of claim 8, wherein the number of data bits stored within the access lane is at least twice the number of error checking bits stored within the access lane.

12. The data processing system of claim 8, wherein the set of error checking bits includes a plurality of error checking bits, and wherein the memory element is configured such that the plurality of error checking bits are distributed across the set of plural of channels into which the access lane is configured, each channel thus respectively configured to store both data bits and a respective one or more error checking bits from the set of error checking bits.

13. The data processing system of claim 8, wherein the set of error checking bits includes a plurality of error checking bits, and wherein the access lane is configured such that the respective set of error checking bits is stored in a respective one of the channels into which the access lane is configured.

14. The data processing system of claim 8, wherein the first access operation is performed as a read-modify write operation.

15. The data processing system of claim 8, wherein when data is to be read from the respective access lane, when the memory error checking scheme is enabled, the memory access logic is configured to issue a read transaction to read the full data width of the access lane, whereas when the memory error checking scheme is not enabled, the memory access logic is configured to issue a read transaction to read only the desired data bits.

16. The data processing system claim 8, wherein the at least one processing unit is a graphics processor or a processing unit within a graphics processor.

17. The data processing system of claim 8, wherein the memory error checking scheme is selectively enabled or not enabled in respect of the memory element on a per-output basis.

18. A method of initialising a memory element access lane for subsequent memory accesses, wherein the memory element access lane has a certain data width and is configured to store within that data width a respective set of data bits and to also store within that data width an associated set of one or more error checking bits for implementing a memory error checking scheme for the set of data bits, the error checking bits thus being stored in the memory element access lane together with the set of data bits, wherein the memory error checking scheme is selectively enabled or not enabled in respect of the memory element, and wherein the method comprises:

when the memory error checking scheme is not enabled in respect of the memory element:

setting the value of each of the error checking bits in the set of error checking bits to a same value, the same value being whichever of 0 or 1 it is more efficient to read from the memory element access lane.

19. The method of claim 18, wherein the memory element access lane is configured as a set of plural channels, each channel corresponding to a respective sub-portion of the memory element access lane, and wherein the set of error checking bits includes a plurality of error checking bits that are distributed across the set of plural of channels into which the memory element access lane is configured, each channel thus respectively operable to store both data bits and a respective one or more error checking bits from the set of error checking bits, the method comprising:

when the memory error checking scheme is not enabled in respect of the memory element:

whenever data is to be written to a particular one of the channels into which the memory element access lane is configured, writing the said same value for each of the error checking bits stored within that channel.

20. The method of claim 18, wherein the memory element access lane is configured as a set of plural channels, each channel corresponding to a respective sub-portion of the memory element access lane, and wherein the set of error checking bits includes a plurality of error checking bits that are stored within a respective one of the channels into which the memory element access lane is configured, the method comprising:

when the memory error checking scheme is not enabled in respect of the memory element:

initially setting the value of each of the error checking bits in the set of error checking bits to said same value; and then controlling subsequent writes such that the respective one of the channels that stores the error checking bits is not written to.

* * * * *